United States Patent [19]

Brännström

[11] 4,421,989
[45] Dec. 20, 1983

[54] POWER PLANT WITH A GAS TURBINE FOR OPERATION OF A GENERATOR

[75] Inventor: Roine Brännström, Finspong, Sweden

[73] Assignee: Stal-Laval Turbin A.B., Finspong, Sweden

[21] Appl. No.: 351,093

[22] Filed: Feb. 22, 1982

[30] Foreign Application Priority Data

Mar. 5, 1981 [SE] Sweden ................................ 8101415

[51] Int. Cl.³ ........................... H02J 3/40; H02P 9/04
[52] U.S. Cl. ................................. 290/40 R; 290/4 R;
290/40 B; 60/39.12; 60/39.282
[58] Field of Search ................. 290/40 R, 40 C, 40 B,
290/4 R, 4 A; 60/39.28 T, 39.28 P, 39.28 R, 39.12

[56] References Cited

U.S. PATENT DOCUMENTS

| | | | |
|---|---|---|---|
| 3,891,915 | 6/1975 | Yannone et al. | 290/40 R X |
| 3,892,975 | 7/1975 | Yannone et al. | 290/40 R |
| 3,919,623 | 11/1975 | Reuther | 290/40 R X |
| 3,924,141 | 12/1975 | Yannone et al. | 290/40 R |
| 4,032,793 | 6/1977 | Uram | 290/40 C |
| 4,081,956 | 4/1978 | Baker et al. | 290/40 R X |
| 4,107,542 | 8/1978 | Heiser | 290/40 R |
| 4,118,635 | 10/1978 | Barrett et al. | 290/40 R |
| 4,133,567 | 1/1979 | McGann | 290/40 R |
| 4,146,270 | 3/1979 | Nurnberger et al. | 290/40 R |
| 4,195,231 | 3/1980 | Reed et al. | 290/40 R |
| 4,201,923 | 5/1980 | Reed et al. | 290/40 R |
| 4,201,924 | 5/1980 | Uram | 290/40 R |
| 4,208,591 | 6/1980 | Yannone et al. | 290/40 R |
| 4,219,738 | 8/1980 | Griesinger | 290/40 R |
| 4,242,592 | 12/1980 | Yannone et al. | 290/40 R |
| 4,283,634 | 8/1981 | Yannone et al. | 290/40 R |
| 4,296,600 | 10/1981 | Abo et al. | 290/40 R X |
| 4,305,129 | 12/1981 | Yannone et al. | 290/40 R X |
| 4,308,463 | 12/1981 | Giras et al. | 290/40 R |
| 4,340,820 | 7/1982 | Meyer-Pittroff et al. | 290/40 R |
| 4,370,560 | 1/1983 | Faulkner et al. | 290/40 R X |

Primary Examiner—J. V. Truhe
Assistant Examiner—Terry Flower
Attorney, Agent, or Firm—Pollock, Vande Sande & Priddy

[57] ABSTRACT

An electrical power plant with gas turbine plant operating with a fluidized bed combustion chamber and a gas turbine-driven electrical generator includes at least one device for rapidly influencing the speed of the generator upon synchronizing the generator for connecting its output into an electrical network. This device may comprise a resistor connectible to the generator output to decelerate the generator, an electrical machine connectible to the generator which is capable of accelerating or decelerating the generator, flow control valves in various gas conduits to rapidly influence the gas flow through one or more of the turbines thereof, an injection nozzle for the injection of water or steam into the combustion gases from the combustion chamber, or an auxiliary combustion chamber for augmenting the thermal output of the fluidized bed combustion chamber.

12 Claims, 1 Drawing Figure

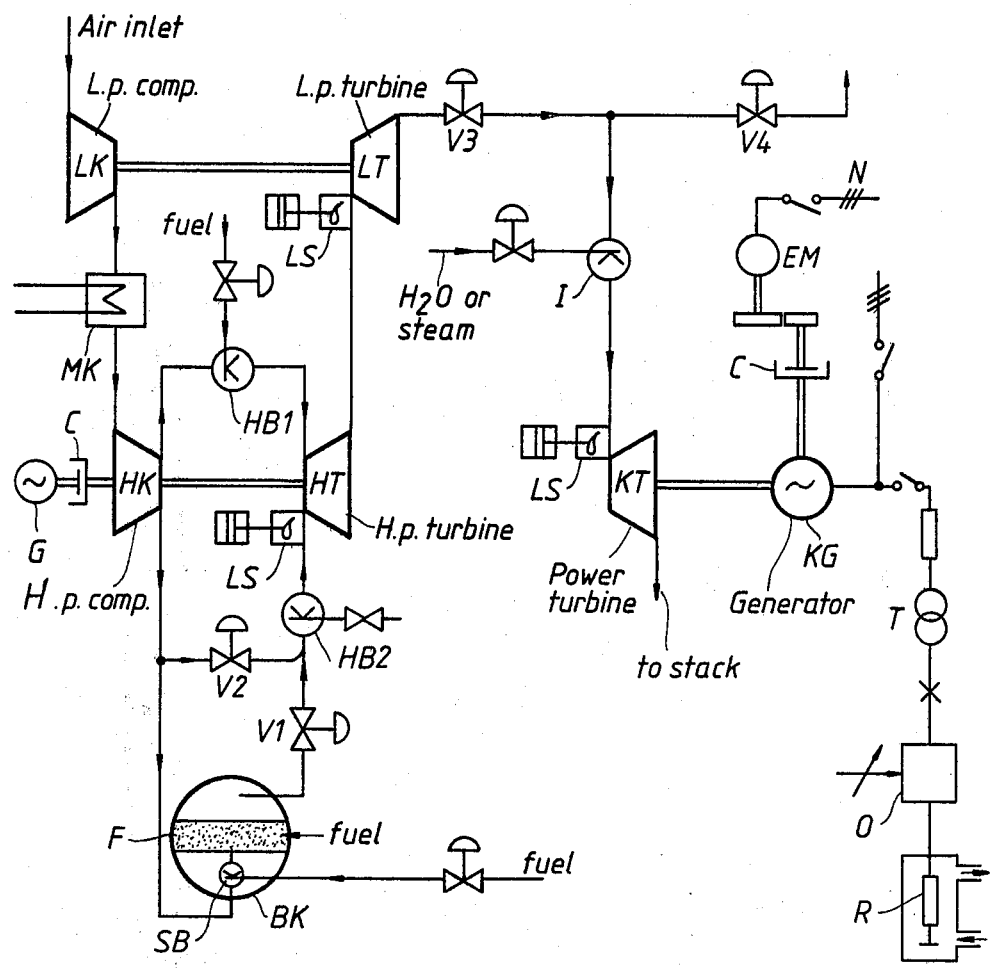

POWER PLANT WITH A GAS TURBINE FOR OPERATION OF A GENERATOR

TECHNICAL FIELD

The present invention relates to an electrical power plant employing a fuel-fired fluidized bed for operation of a gas turbine driving an electrical generator. The plant comprises a compressor unit with one or more compressors feeding combustion air to the fluidized bed, the compressors being powered by one or more gas turbines receiving combustion gases from the fluidized bed.

TECHNICAL PROBLEM SOLVED

As it is nowadays desirable to at least reduce a nation's dependence on oil for the generation of electrical power, there is a considerable interest in electrical power plants which utilize the combustion of solid fuels in fluidized beds. Combustion of solid fuel in a fluidized bed allows cost-effective absorption of sulfur residues from the fuel so that atmospheric discharge of acidifying sulfur dioxide is prevented. Power plants of the kind to which this invention relates are primarily suited for large installations and especially installations with a relatively constant electrical load, since both the operation of a fluidized bed and the combustion of solid fuel result in a system having a rather slow control response, from a thermal point of view. This, in turn, involves certain problems with the commissioning of a power plant, and particularly with the synchronizing of the electric generator to an electrical network to which it is to supply power, since the generator speed must be accurately adjusted to correspond to the power frequency of that network. Because of the inherent inertia of a solid fuel-fired, fluidized bed power plant combined with inevitable variations in the quality of the fuel burnt, it has proved difficult to adjust the generator speed sufficiently rapidly using conventional techniques.

SUMMARY OF INVENTION

According to the invention, there is provided an electrical power plant comprising a fluidized bed combustion chamber, means to supply fuel to a fluidized bed in the combustion chamber, a gas turbine plant comprising a compressor part for feeding combustion air to the combustion chamber and a first turbine part driven by combustion gases from the combustion chamber for operating the compressor part, and a second turbine part with a power turbine and an electrical generator driven thereby, which is characterized in that in addition to devices for regulating the combustion in the combustion chamber, the power plant is equipped with at least one means for rapidly influencing the speed of the generator during synchronizing of the generator for connection of the electrical output thereof into an electrical network.

A variety of different means can be used to modify the speed of the generator to effect the necessary synchronization and the preferred means can be selected on the basis of suitability for any given plant.

BRIEF DESCRIPTION OF DRAWING

The invention will now be described in greater detail, by way of example, with reference to the accompanying drawing which shows a power plant of the kind referred to.

The drawing shows a number of different devices for obtaining rapid changes in the speed of the power turbine generator set of the plant. As mentioned above, each one of these devices alone may give the desired sensitivity of control, although in certain cases it may be of interest to combine more than one of the devices. For the sake of simplicity, all the devices now to be described are shown in a single power plant, and this provides a good general view of all the possibilities available within the ambit of the present invention.

DETAILED DESCRIPTION OF DRAWING

A multi-shaft turbine power plant is illustrated in the drawing, but the invention is also applicable to a power plant having a single-shaft turbine.

In general terms, the plant illustrated comprises a low-pressure compressor LK and a high-pressure compressor HK, between which an optional intermediate cooler MK has been shown. These two compressors are driven by the corresponding high-pressure turbine HT and low-pressure turbine LT. Between the high-pressure compressor HK and the high-pressure turbine HT, a pressurised combustion chamber BK is located having a fluidized bed F fed with solid fuel. The combustion chamber BK is provided with a start-up combustion chamber SB with a valve-controlled fuel supply.

When the plant is operating, air is drawn into the low-pressure compressor LK, further compressed in the high-pressure compressor HK and heated in the fluidized bed F to a suitable high temperature. The hot exhaust gases drive the high-pressure compressor HK via the high-pressure turbine HT and the low-pressure compressor LK via the low-pressure turbine LT. An electric drive motor G and releasable coupling C are provided to power the high-pressure compressor HK during the start-up procedure.

From the low-pressure turbine LT, the exhaust gases are fed to a power turbine KT which drives an electric generator KG employed to feed electrical power to a network N. The turbines HT, LT and KT may have fixed guide vanes or guide vanes which can be adjusted by the units LS. From the power turbine KT, the exhaust gases are passed to a chimney stack, possibly via a heat exchanger and/or a gas cleaning plant (not shown). The plant described heretofore is completely conventional and is also provided with an auxiliary unit and a regulating system (neither of which are shown) of a known type for normal operation.

However, the invention relates to the provision of one or more of the special devices also shown in the drawing for limited but rapid control of the generator KG for facilitating synchronizing the output of the generator KG to the network N and these devices will now be described.

DESCRIPTION OF PREFERRED EMBODIMENTS

One possibility for providing the desired control is to provide the plant with an electric load R which can be connected to the generator KG when required. The load R may be connected to the generator via a transformer T and a regulator O for controlling the actual load applied. Since these components will only ever be used for short periods at a time and are only required to produce a certain limited deceleration of the generator, they may be relatively primitive and robust. The load R may suitably be a resistor, liquid-cooled as shown in the drawing.

A second possibility for trimming the speed of the generator KG is to provide the plant with an electrical machine EM which may be connected via a releasable coupling C to the power turbine/generator set KT, KG. The machine EM should be capable of being operated either as a motor or as a generator, thus allowing the speed of the main generator KG to be rapidly increased or decreased by the required small amount.

A third possibility is to provide a throttle valve V1 or V3 in the exhaust gas line, which permits the overall mass flow through the turbines HT, LT, KT to be rapidly adjusted. The valve V1 is shown positioned between the combustion chamber BK and the high-pressure turbine HT, and the valve V3 is shown positioned between the low-pressure turbine LT and the power turbine KT.

A fourth possibility consists of arranging a regulating valve, in the form of a by-pass valve V2, in a conduit between the supply conduit for the combustion air to the combustion chamber BK and the conduit for the combustion gases which leave the combustion chamber BK. With such a valve V2, the temperature of the propellent gas fed to the turbines may be rapidly reduced at any time.

A fifth possibility is to provide a dump valve V4 which permits a proportion of the propellent gas to be leaked from the conduit between the low-pressure turbine LT and the power turbine KT.

A sixth possibility is to arranged a nozzle I in the gas conduit between the low-pressure turbine LT of the compressor part and the power turbine KT of the turbo/generator set and to inject water or steam thereinto to rapidly influence the speed of the power turbine.

A seventh possibility is to provide a separate fuel-fed combustion chamber HB1 or HB2 either in parallel with, or in series with, the main combustion chamber BK, and thereby make possible a rapid increase in thermal energy content of the combustion gases.

It is to be understood that the above description and accompanying drawing are illustrative only since equivalent components to those described could be substituted without departing from the spirit and scope of the invention defined in the following claims.

What is claimed is:

1. A electrical power plant comprising:
    a fluidized bed combustion chamber,
    means to supply fuel to a fluidized bed in the combustion chamber,
    a gas turbine plant comprising a compressor part for feeding combustion air to the combustion chamber and a first turbine part driven by combustion gases from the combustion chamber for operating the compressor part, and
    a second turbine part with a power turbine and an electrical generator driven thereby,
    characterized in that,
    in addition to devices for regulating the combustion in the combustion chamber, the power plant is equipped with at least one means for rapidly influencing the speed of the generator during synchronizing of the generator for connection of the electrical output thereof into an electrical network.

2. A power plant according to claim 1, in which the means for influencing the generator speed comprises an electrical load, and means for connecting the load to the electrical output of the generator thereby to decelerate the generator.

3. A power plant according to claim 1, in which the means for influencing the speed comprises an electrical machine, and means for connecting said machine to the generator for increasing or reducing its rotational speed.

4. A power plant according to claim 1, in which the means for influencing the speed comprises a throttle valve means in a conduit for the combustion gases flowing from the combustion chamber to the power turbine.

5. A power plant according to claim 4, in which the throttle valve means is located between the combustion chamber and a turbine of the gas turbine part.

6. A power plant according to claim 4, in which the throttle valve means is located between the gas turbine part and the power turbine of the second turbine part.

7. A power plant according to claim 1, in which the means for influencing the speed comprises a by-pass conduit between a supply conduit feeding combustion air to the combustion chamber and a discharge conduit feeding combustion gases from the combustion chamber, and flow-control valve means in said by-pass conduit.

8. A power plant according to claim 1, in which the means for influencing the speed comprises a dump valve means adapted to bleed off gas from a conduit feeding combustion gases from said first turbine part to said power turbine.

9. A power plant according to claim 1, in which an injection device is provided in a gas conduit extending between the first turbine part and the power turbine and means for feeding water to said injection device.

10. A power plant according to claim 1, in which an injection device is provided in a gas conduit extending between the first turbine part and the power turbine and means for feeding steam to said injection device.

11. A power plant according to claim 1, in which a separate combustion chamber is arranged in series with the main combustion chamber and means is provided to burn fuel in said separate combustion chamber.

12. A power plant according to claim 1, in which a separate combustion chamber is arranged in parallel with the main combustion chamber and means is provided to burn fuel in said separate combustion chamber.

* * * * *

UNITED STATES PATENT AND TRADEMARK OFFICE
CERTIFICATE OF CORRECTION

PATENT NO. : 4,421,989
DATED : December 20, 1983
INVENTOR(S) : Roine Brannstrom

It is certified that error appears in the above—identified patent and that said Letters Patent is hereby corrected as shown below:

[22] Filed: February 23, 1982

Signed and Sealed this

Tenth Day of April 1984

[SEAL]

Attest:

GERALD J. MOSSINGHOFF

Attesting Officer    Commissioner of Patents and Trademarks